United States Patent [19]

Desverchere et al.

[11] Patent Number: 5,033,189
[45] Date of Patent: Jul. 23, 1991

[54] PROCESS FOR MANUFACTURING A GASKET COMPRISING A METAL BODY EQUIPPED WITH AT LEAST ONE FLEXIBLE SEALING ELEMENT

[75] Inventors: Jean G. Desverchere, Lyons; Francisque M. Thiaullier, Saint Priest, both of France

[73] Assignee: Curty S.A., Saint Priest, France

[21] Appl. No.: 505,707

[22] Filed: Apr. 5, 1990

[30] Foreign Application Priority Data

Apr. 18, 1989 [FR] France .................... 89 05763

[51] Int. Cl.⁵ ........................................... B23P 15/00
[52] U.S. Cl. ...................... 29/888.3; 29/527.4; 72/335; 277/1; 277/235 B
[58] Field of Search ...................... 29/888.3, 527.4; 72/335, 379.2; 277/1, 235 R, 235 A, 235 B

[56] References Cited

U.S. PATENT DOCUMENTS

| 1,935,552 | 11/1933 | Fitzgerald | 29/888.3 |
| 3,596,493 | 8/1971 | Lachaussee | 72/335 |
| 4,591,166 | 5/1986 | Atkinson et al. | 277/1 |
| 4,719,065 | 1/1988 | Gibbon | 29/527.4 X |
| 4,776,073 | 10/1988 | Udagawa | 29/888.3 |
| 4,817,969 | 4/1989 | McDowell et al. | 277/235 B |
| 4,958,430 | 9/1990 | Grieb et al. | 72/335 |

FOREIGN PATENT DOCUMENTS 2215788  9/1989  United Kingdom ............ 29/888.3

Primary Examiner—Howard N. Goldberg
Assistant Examiner—I. Cuda
Attorney, Agent, or Firm—Herbert Dubno

[57] ABSTRACT

A process for making gaskets consists in forming, in the body, holes regularly distributed along each line intended to receive a sealing element, in effecting, by stamping, the formation of a groove along each line intended to receive a sealing element, and in effecting the molding of sealing elements in each groove which the body comprises.

5 Claims, 2 Drawing Sheets

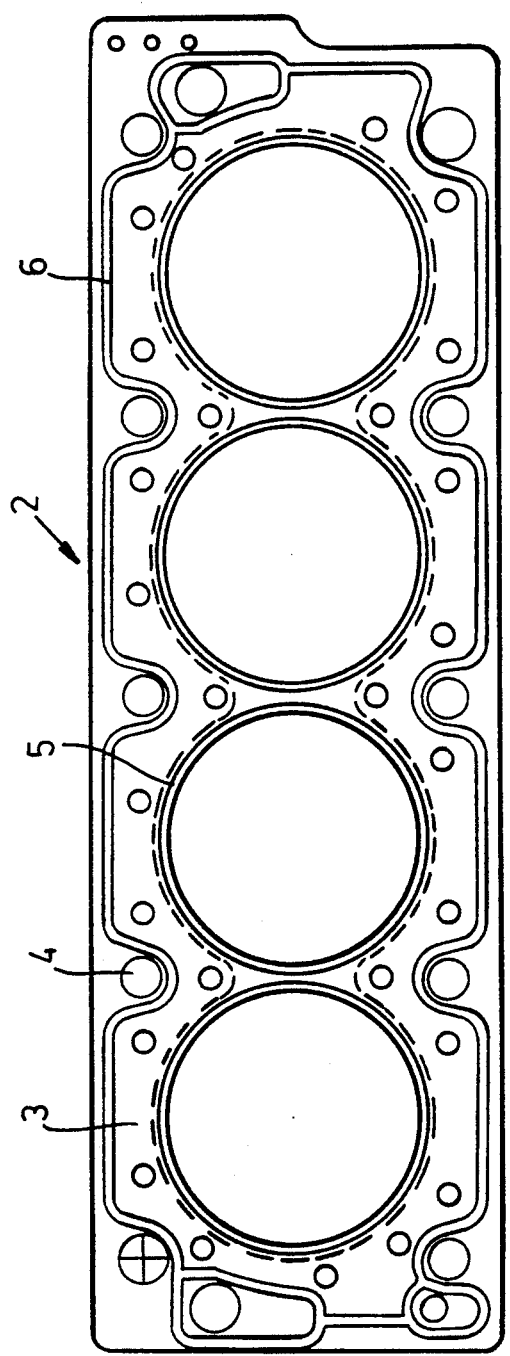
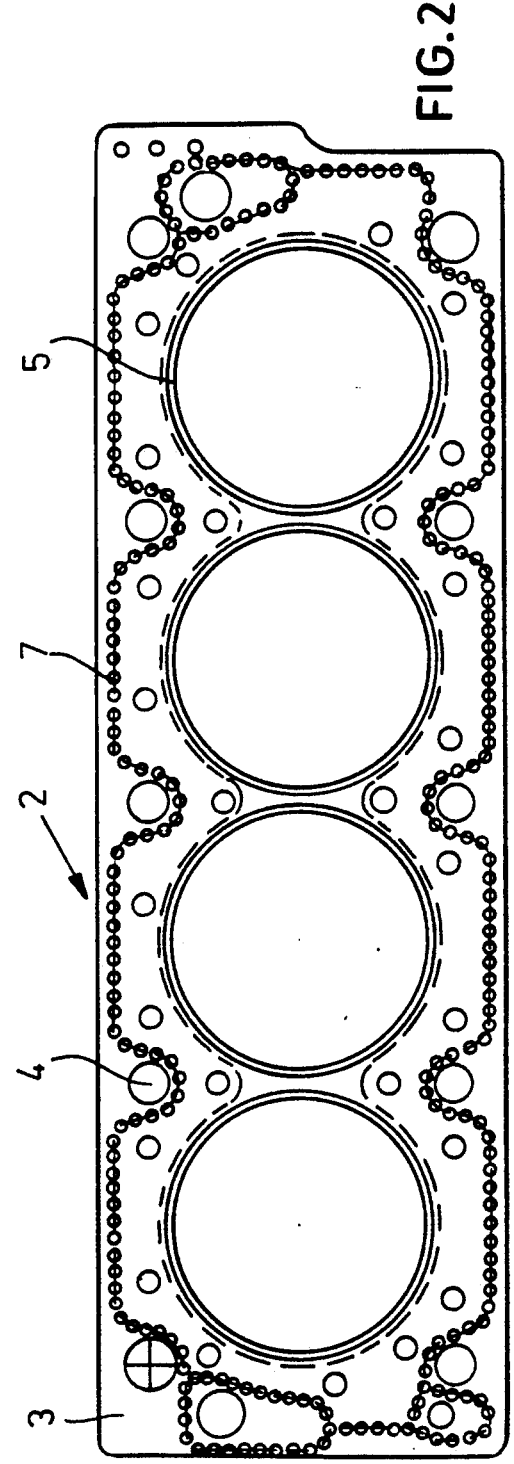
FIG.1
FIG.2

PROCESS FOR MANUFACTURING A GASKET COMPRISING A METAL BODY EQUIPPED WITH AT LEAST ONE FLEXIBLE SEALING ELEMENT

Background of the Invention

The present invention relates to a process for manufacturing a gasket comprising a metal body equipped with at least one flexible sealing element. In numerous areas of mechanical engineering, it is necessary to use gaskets intended to provide sealing, in particular in the region of passages for fluids such as cooling liquids, lubricating liquids or gaseous fluids such as combustible mixtures in the case of an internal combustion engine.

Description of the Prior Art

Internal combustion engines are equipped with a certain number of gaskets, such as cylinder-head gaskets, gaskets for the intake of the combustive mixture or water-pump, petrol-pump and distribution gaskets.

It has been known for a long time to construct gaskets comprising a body, for example of asbestos fiber board or the like, having openings in the region of the combustion chambers or in the region of the liquid passages and clamping orifices.

In the case of the combustion chambers, sealing is provided by complex mechanical parts called "fire rings". In the case of the cooling-liquid or lubricating-liquid passages, sealing is provided by flexible strips of elastomer.

Certain types of gaskets comprise a metal body. There is the problem of fastening the flexible sealing elements on each face of this metal body.

Firstly it is necessary to construct grooves in each face of the body, these grooves being obtained by machining or chemical attack.

After the groove-forming operation, which is a complex operation, has been completed, the gasket body is degreased, an adhesion primer is applied to the base of each groove and then a strip is molded onto each face of the body.

On account of its structure, the body requires two specific moldings on each of its faces.

Finally, although this solution is complex, time-consuming and expensive to implement, it is nevertheless not entirely satisfactory owing to the fact that the sealing element is inadequately retained in the groove serving to accommodate it, it being possible for the sealing element to become detached from the groove under the influence of laterally exerted stresses.

Summary of the Invention

The object of the present invention is to provide a process for manufacturing gaskets comprising a metal body, which is simple and economical to implement and ensures perfect retention of each sealing element in the groove serving to accommodate it.

To this end, the process with which the invention is concerned consists:

- in forming, in the body, holes regularly distributed along each line intended to receive a sealing element,
- in effecting, by stamping, the formation of a groove along each line intended to receive a sealing element and,
- in effecting the molding of sealing elements in each groove which the body comprises.

It should be noted that the operation for forming the slots by stamping is made possible by virtue of the presence of the holes which have been previously formed in the body. In fact, during stamping, the material creeps inside the holes, reducing the cross-section of the latter, which become slots of irregular shapes.

It is thus possible to construct grooves in a simple, economical and rapid manner, without deforming the body and without forming an excessive thickness at the surface thereof, since the material creeps exclusively into the previously formed holes.

Advantageously, the holes formed in the body of the gasket are through holes. This technique is advantageous as it permits, after stamping, slots to be obtained which themselves pass through, thereby making it possible to mold the sealing strips onto the two faces of the body during a single operation and ensuring the formation of joining zones between the sealing elements formed on the two faces of the body, avoiding any risk of the latter becoming detached, as is the case customarily.

The holes formed in the body of the gasket may be of circular, square or rectangular cross-section or have the shape of a diabolo, the central zone of the hole being narrower than the end zones. The latter structure makes it possible to limit the creep of the material in the region of the edges of the groove during the formation of the latter. The holes may be provided in the body of the gasket, centered or zigzag relative to the center line of the groove.

Brief Description of the Drawing

In any event, the invention will be clearly understood with the aid of the description which follows, with reference to the accompanying diagrammatic drawing showing, by way of a non-limiting example, an embodiment of a cylinder-head gasket obtained by the process according to the invention:

FIG. 1 is a front view of this finished gasket.

FIGS. 2 and 3 are two front views thereof after completion of two intermediate stages of construction.

Description of the Preferred Embodiment

Figure 3:
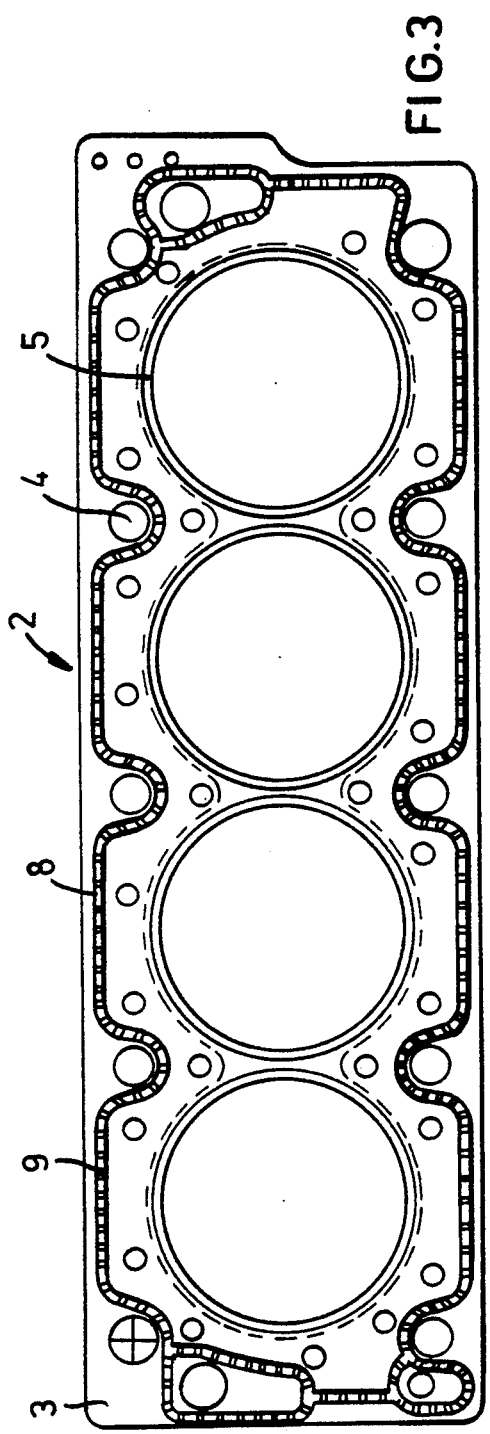

The gasket 2, shown in the drawing, is a cylinder-head gasket comprising a metal body 3 having clamping holes 4 and also fire rings 5. It is appropriate to provide sealing against fluids with the aid of sealing elements 6 applied on the two faces of the body and consisting of a flexible elastomeric material possessing good mechanical strength.

Figure 4:
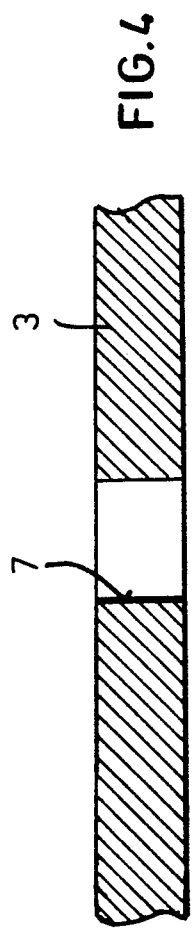
FIGS. 4 and 5 are two views, in partial cross-section and to an enlarged scale, of this gasket, after the manufacturing stage of FIG. 2 and the finished gasket, respectively.
Figure 5:
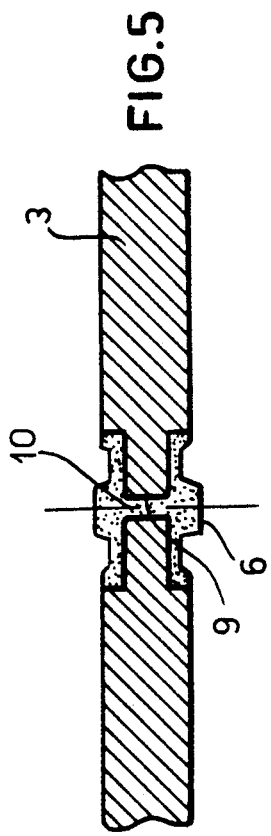

The process for obtaining this gasket 2 consists in forming, along the line on which the sealing elements 6 are to be applied, through holes 7 of circular cross-section, regularly distributed as shown in FIGS. 2 and 4.

After forming these holes 7, the two grooves 8 emerging on the two faces of the body 3 are formed by stamping, the formation of these grooves ensuring the creep of the material into the holes 7, the cross-section of which is reduced and which thus form slots 9.

It should be noted that, by virtue of the creep of the material into the holes 7, the surface of the two opposite walls of the gasket 3 is in no way impaired.

Finally, during a single molding operation at ambient temperature, followed by hot finishing, the sealing strips 6 are applied, this molding in a single operation being made possible by virtue of the presence of the through slots 9.

This technique results in the formation of joining bridges 10 in the region of each slot 9, between the two strips 6 arranged in the grooves 8 formed in the two walls of the body 3.

As is evident from the text above, the process according to the invention is very economical since it makes it possible to obtain, simply and rapidly, the grooves intended to accommodate the sealing strips, without having to employ surface treatment operations. In addition, this process makes it possible to mold the strips onto the two faces of the body during a single operation, and ensures that the two strips are secured, thereby avoiding any risk of the latter subsequently becoming detached.

It goes without saying that the invention is not limited to the single method of implementing this process described above by way of example; on the contrary, it embraces all variants thereof.

Thus, in particular, the holes formed in the metal body could be other than through holes, which would necessitate two successive molding operations, without in any way departing from the scope of the invention.

We claim:

1. A process for manufacturing a gasket comprising a metal body equipped with at least one flexible sealing element, which consists in forming, in the body, (3) holes (7) regularly distributed along each line intended to receive a sealing element, in effecting, by stamping, the formation of a groove (8) along each line intended to receive a sealing element, and in effecting the molding of sealing elements (6) in each groove (8) which the body comprises.

2. The process as claimed in claim 1, wherein the holes (7) formed in the body of the gasket are through holes.

3. The process as claimed in claim 1, wherein each hole has, seen in cross-section parallel to the plane of the gasket, the shape of a diabolo, having a central zone narrower than its end zones.

4. The process as claimed in claim 1, wherein the holes (7) are formed symmetrically relative to the center line of each groove (8) of the body.

5. The process as claimed in claim 1, wherein the holes (7) are formed zigzag relative to the center line of each groove (8) of the body.

* * * * *